United States Patent
Jones et al.

(10) Patent No.: US 10,262,191 B2
(45) Date of Patent: Apr. 16, 2019

(54) SYSTEM AND METHOD FOR MANUFACTURING AND INSPECTING IDENTIFICATION DOCUMENTS

(71) Applicant: MorphoTrust USA, LLC, Billerica, MA (US)

(72) Inventors: Robert Jones, Andover, MA (US); Yecheng Wu, Lexington, MA (US); Stephen Miu, Chelmsford, MA (US)

(73) Assignee: MorphoTrust USA, LLC, Billerica, MA (US)

( * ) Notice: Subject to any disclaimer, the term of this patent is extended or adjusted under 35 U.S.C. 154(b) by 0 days.

(21) Appl. No.: 15/453,777

(22) Filed: Mar. 8, 2017

(65) Prior Publication Data

US 2018/0260617 A1    Sep. 13, 2018

(51) Int. Cl.
| | | |
|---|---|---|
| G06K 9/00 | (2006.01) | |
| G06K 7/10 | (2006.01) | |
| G06K 7/14 | (2006.01) | |
| G06T 1/00 | (2006.01) | |

(52) U.S. Cl.
CPC ..... *G06K 9/00288* (2013.01); *G06K 7/10722* (2013.01); *G06K 7/1417* (2013.01); *G06T 1/0021* (2013.01); *G06K 9/00456* (2013.01)

(58) Field of Classification Search
CPC .................................................. G06K 9/0028
See application file for complete search history.

(56) References Cited

U.S. PATENT DOCUMENTS

| | | | |
|---|---|---|---|
| 8,024,269 B1* | 9/2011 | Ballard | G06Q 10/10 705/35 |
| 9,059,972 B2 | 6/2015 | Redpath | |
| 9,679,126 B2* | 6/2017 | Warrier | G06F 21/32 |
| 2009/0100269 A1* | 4/2009 | Naccache | H04L 9/3271 713/186 |
| 2012/0200390 A1 | 8/2012 | Saravanan | |
| 2012/0293642 A1* | 11/2012 | Berini | G06F 21/32 348/77 |
| 2014/0325233 A1* | 10/2014 | Carlson | G06F 21/16 713/176 |
| 2015/0058950 A1 | 2/2015 | Miu | |
| 2015/0269389 A1* | 9/2015 | Lee | H04L 63/0435 713/164 |
| 2016/0149886 A1* | 5/2016 | Korokithakis | G06F 21/45 726/6 |
| 2016/0248765 A1* | 8/2016 | Saxena | H04L 63/0861 |
| 2017/0053373 A1 | 2/2017 | Martin | |
| 2017/0310664 A1* | 10/2017 | Satkunarajah | H04L 63/0861 |
| 2018/0060547 A1* | 3/2018 | Holz | G06F 21/6245 |
| 2018/0130168 A1* | 5/2018 | Nayshtut | G06K 9/00899 |
| 2018/0131772 A1* | 5/2018 | Nealis | H04L 67/141 |

FOREIGN PATENT DOCUMENTS

WO   WO 2014/197202   12/2014

OTHER PUBLICATIONS

International Search Report in International Application No. PCT/US18/21521, dated May 2, 2018, 2 pages.

\* cited by examiner

*Primary Examiner* — Jerome Grant, II
(74) *Attorney, Agent, or Firm* — Fish & Richardson P.C.

(57) ABSTRACT

A document authentication system is configured to support enhanced services with advanced security features within a document and by linking information embedded in the document with a secure infrastructure.

20 Claims, 8 Drawing Sheets

SYSTEM AND METHOD FOR MANUFACTURING AND INSPECTING IDENTIFICATION DOCUMENTS

FIELD

The present specification is related generally to the fabrication and inspection of physical identification documents.

BACKGROUND

Physical identification cards such as driver licenses are commonly used for verifying the identity of an individual, providing access to restricted areas, or authorizing an individual to purchase age-restricted content.

BRIEF DESCRIPTION OF THE DRAWINGS

In the drawings, like reference numbers represent corresponding parts throughout.

DETAILED DESCRIPTION

Figure 1A:
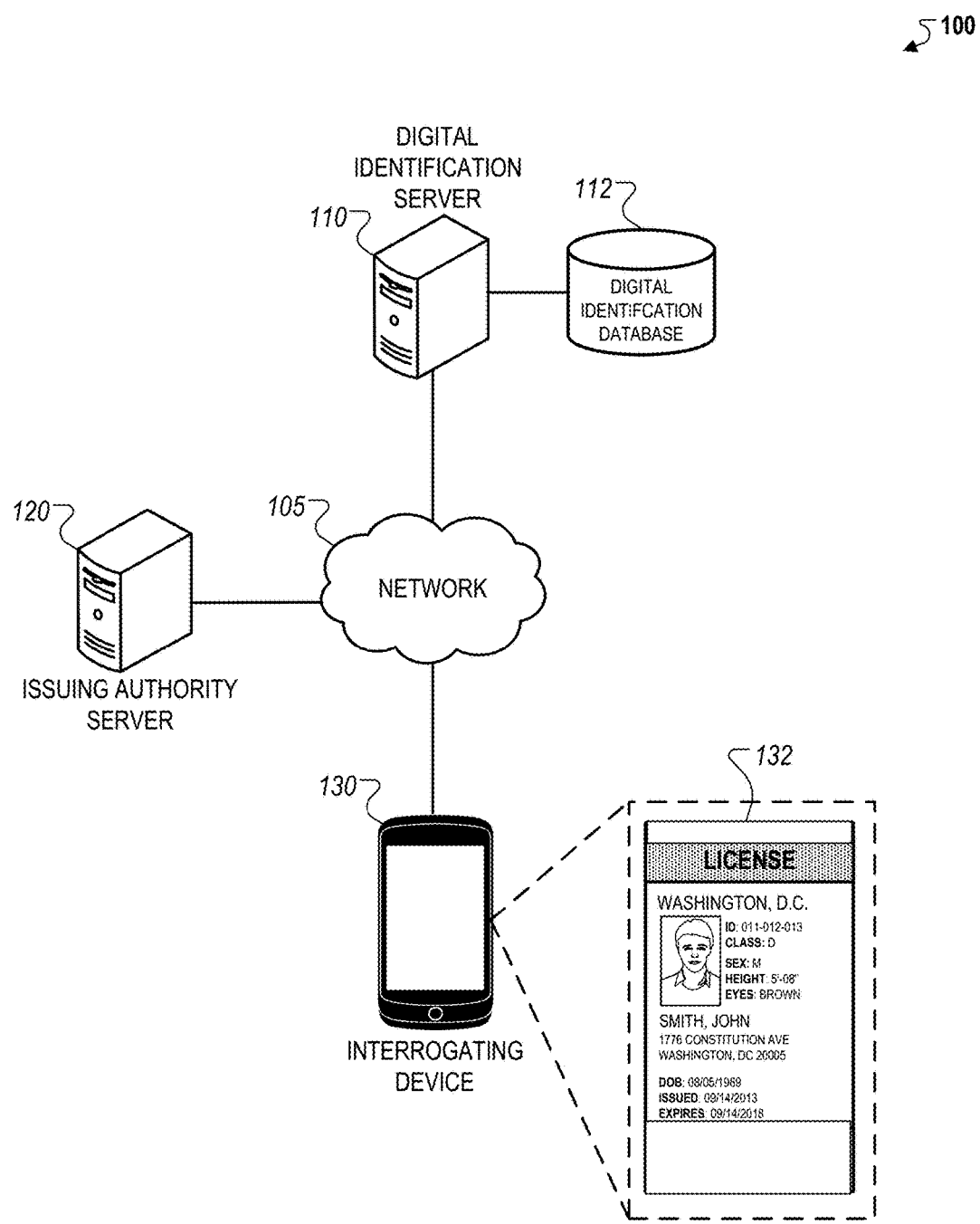
FIG. 1A illustrates a block diagram of an example system for providing enhanced physical identification documents.

Identification documents play a vital role in society. Whether used in physical access control systems to unlock doors, in timekeeping role for personnel and employee wage systems, or to authorize purchase of age restricted goods like alcohol or tobacco, society is increasingly depending upon high assurance identity validation and verification systems. These pressures have led to the emergence of sophisticated illicit actors willing to adopt increasingly sophisticated measures to commit fraud and other illegal and undesirable transactions.

Identity card manufacturers (e.g., state and national governments and their suppliers) have adopted varying measures to combat this fraud. In some instances, watermarks have been adopted that allows steganographic and other techniques to embed verification data within an identity document. Fraudulent actors using less sophisticated devices can be detected through technical means designed to inspect the watermarks. Still, these measures may not sufficiently address technological actors able to duplicate watermarks or an individual that presents someone else's identification document.

Law enforcement and other organizations (e.g., companies) may afford networked access to databases designed to support field personnel. For example, a law enforcement officer (LEO) may have a networked camera configured to automatically inspect driver's licenses and retrieve information about expected vehicle occupants so that the LEO has actionable information during scenarios that include a routine traffic stop. This capability exists in other configurations, such as, for example, a national fingerprint database and other tools designed to provide information designed to support agents in the field.

One challenge is that the actionable information as well as information appearing within an identity document itself is sensitive and may be used for improper purposes. Further, it is often desirable to close the loop so that a LEO is not asked to make judgment decisions as to an identity where an individual's physical appearance may change as a result of age, ambient lighting conditions, photographic capture configurations (e.g., distance and exposure), and other cosmetic reasons (changing hair length and/or skin color).

As a result of these pressures and capabilities, a system may be configured to provide identification documents, interrogating systems, and host capabilities that protect sensitive information while also providing high assurance capabilities.

In general, this specification describes methods and systems for provisioning enhanced digital validation and verification services for field personnel (e.g., a LEO) while also combatting unauthorized disclosure of sensitive and other personally identifiable information (i.e., PII). For instance, a record describing an online digital identification may be complementary and configured to align with a physical identification card such that a field agent can inspect a physical identification card using a portable electronic device as an interrogating device (e.g., a wireless phone). In some instances, the digital identification may include multiple security protocols to protect user information against fraud and counterfeiting.

Thus, an identity document ecosystem may be configured to support the inspection of identification documents using information from a server. A wireless device may read via machine readable information reference information from an identification document such as a QR ("Quick Response) code. The machine readable information may include a network address or record identifier that is used to retrieve a record from a host, such as server for a state department of motor vehicles ("DMV"). The wireless device configures a request that is sent to a host, in order to support a second stage of processing of the identification document. For example, the wireless device may translate a record number and install the record number in a HTTP Get Request alongside accreditation information so that the wireless device is presented as an accredited device. The wireless device transmits the request to the host, which returns with a watermark decode instruction for the second stage of processing on the identification document. For example, the watermark decode instruction may include a decryption or decoding key to read a biometric template for a fingerprint or facial image, a map for reading a watermark within an identification document, and/or a key for PII information. In the second stage of processing on the identification document, the watermark decode instruction is used to read a second portion of information from the identification document. A biometric template or PII may be read in this stage. The wireless device is then used to capture a biometric signal from a user presenting the identification document. For example, a camera on a wireless phone may be used, or a user may be asked to print a print into a print sensor. The biometric signal for the user is compared to the second portion of information, for example, where the facial template stored on the ID card is compared to a captured image of the user. Based on relating the biometric signal to the second portion of information, an indication of whether the user presenting the identification document has biometric characteristics related biometric data to the second portion of information associated with the identification document is provided. For example, the wireless device may indicate a numerical score to a LEO (e.g., 85% confidence in a match) or a Boolean warning may be generated. The score and/or decision based on scoring may be used to effectuate retrieval of additional records from an online database, or activate a record in a timekeeping system, provide access to a workstation, or effectuate changes in an access control system.

Once validated, a field agent may be configured to access digital identification stored online, which is then made available to the field agent for several reasons. For instance, the digital identification may be used to verify the identity of a user at various retail locations that require age verification (e.g., alcohol stores, gun stores, etc.), airports, locations of financial transactions (e.g., bank offices, lender and other financial officers, etc.), healthcare institutions (e.g., hospitals, doctor's offices, etc.), and/or government offices (e.g., post office, department of motor vehicles, etc.). In some instances, the agent may use the digital identification to access privileged or otherwise restricted services and/or information. In this regard, the digital identification may be used as to facilitate additional checks or verification performed by the agent to support additional user authentication processes. For example, in the context of a hospital, once a driver's license has been verified using facial recognition, different treatment centers within a hospital may be configured to support biometric authentication so that an admitted patient may simply later present a thumb print in order to register at a radiology or physical therapy center. The first authentication with the physical identification document may be used to limit the size of the biometric databases later referenced in the hospital in order to maximize the likelihood of success.

Such an architecture may be used in a transition to enhanced penetration and adoption of digital services in the form of a digital identification document that is resident on a wireless device. While digital identification documents may be attractive for certain use cases, various impediments may exist that preclude or curtail adoption of such technologies. Such technologies may not be accredited by one or more regulatory authorities or such technologies may not be accredited for certain use cases, particularly where digital identification documents are the focus of fraudulent efforts. Illicit actors may try and develop solution attempting to mimic the behavior of authorized digital identification documents. In addition, there may be issues of cultural and commercial acceptance where vendors worry about liability associated with newly-approved solutions. In addition, wireless devices may face challenges associated with limited battery life. Wireless devices also may face difficulty in being adopted by certain individuals, a situation that may have a greater impact on elderly, disabled, and impoverished populations.

The logistics of adoption and reliance of an end-to-end system based on digital identification documents can be quite cumbersome and so large to the extent that such an unveiling cannot be instantly or quickly unveiled. A gradual or tiered rollout may be lead to wider adoption in a way that does not jeopardize mission-critical verification operations performed by law enforcement and others. However, it may be possible for offer enhanced information services to field agents by developing a digital server infrastructure, which provides enhanced information to the field agents. The digital server infrastructure is configured to interface with an interrogation device that, in turn, is configured to inspect and verify physical identification documents.

Thus, a physical driver's license may be configured to interface with an electronic support system that offers benefits associated with an infrastructure that also may be configured to support digital identification documents, such as increased authenticity through network protocols, while also providing the benefits of a physical identification document. That is, information appearing in a physical driver's license may be linked through a network connection to an authentication server that determines the degree of a match to a facial or finger template and digital watermarking (DWM) for identity proof. The DWM is not digital in that it appears on a electronic device. Rather, the DWM reflects a sources that has digitally modified so as to invariably incorporate machine-readable information without modifying the encompassing mark. This ability to establish a network connection with a credentialing and authentication server extends advanced capabilities, allowing companies and government agencies to receive a greater degree of assurances as to person's identity in a secure manner through the server. Such increased assurances allow scalable capability in environments such as border control and assignments, physical access control systems (e.g., restricted areas in an airport, authenticating financial transactions), or other situations where confirmation of an individual identity is desired.

A physical identification document may feature a Quick Response Code (QR Code) or other printed, machine readable label that may be read from a mobile smart phone featuring a camera with minimal resolution. As a result of embedding a linkable QR code into the identification document, the credential may read a link that may be used to verify and confirm personally identifiable information (PII) on the back of the card. While a physical identification document may include an ink-based rendering of the PII on the surface of the card and in the QR Code itself, issuing authorities may wish to limit access to PII unless the bearer of the card is able to verify their identity through the server.

In particular, the QR code may be used to retrieve a biometric template for the user. That is, a physical identification document may be offered up to a wireless device that reads the QR code in order to retrieve the biometric template from the server. The wireless device then may develop a biometric snapshot for the user, for example, by taking a picture of the face of the user presenting the physical identification document. The wireless device then may compare actual biometric data that is read and compare the read data to the biometric template associated with the user's profile. The comparison may be used to make a determination to confirm the user's identity. When the identity is confirmed because the similarity is more than a threshold, information required to access PII may be released. When the identity cannot be confirmed, the bearer of the wireless device may receive a notification that the identity cannot be confirmed. The bearer is then empowered to act responsively, for example, by not supporting the requested activity.

Note that confirming the user's identity may not necessarily release PII itself. Instead, confirming user identity by comparing a network-based biometric template to an actual biometric may include downloading a key that is used to read encrypted information resident on the physical identification document itself. For example, PII may be embedded and/or encrypted as a DWM and/or in a portion of the physical identification document itself. Confirming identification may provide a key or instruction required to read the PII from the physical identification document itself. Alternatively, or in addition, newly-read PII may be presented in association with information from the server in order to provide yet another degree of validation and/or verification. For example, where the physical identification document itself is linked to a hospital administration system, PII relating to medical credentials may be written into the physical identification document. This retrieved PII may be further verified with information resident on a hospital server to verify that the user possesses the designated medical credentials.

In one configuration, facial recognition technology may be employed via use of user cameras in order to take a "selfie" or an image of the card holder in addition to special DWM technology on the back of a physical card written in color or B&W. A card may embed 56 bits of data (or more) in a predefined image using steganography to camouflage the data. This also may be implemented as a secondary mark inside a preprinted background that also includes a mark. The credential also may bear a QR code that directs the card holder to the authentication server. The server then may be configured to decode one or more of the multiple DWM's in a preprinted area and/or background. An application from an interrogating user (e.g., a law enforcement officer) then may prompt the user of the card for a selfie or photo be sent of the card holder.

A high degree of accuracy in encoding PII via DWM in preprint, background and picture in several of areas of the physical identification document may be attained.

In one configuration, the back of the credential is used primarily for the purpose of maintaining information that connects to the Internet for the purpose of providing proof of identity or confirming identity. In this configuration, an interrogating user simply takes a picture of the back of the card with a mobile device. The wireless device reads the QR code printed on the back (embedded in the preprint) and sends the image to the data base server. The server then analyzes the image and extracts the personal information from the DWM printed on the back hidden within the preprint pattern (similar to the secondary mark in DL's). The server then sends the data (name and DOB or other data) back to the same mobile phone. A static image may bear a mark that is variable insofar as it is dependent upon on the credential bearer. More precisely, only the mark is variable within the larger static image. That is, the image, although static, will change "imperceptibly" from credential to credential with the embedding of the watermark in the image. The mark in the background preprint will be a portion of the hash which is split between the static image and background.

An encryption key may be included in the line segment code on the back or a hash between the DWM and the line code can be generated. Since the line code is capable many more bits of data than the DWM, it may reasonable to use line code to contain this along with other personally identifiable information (PII). So, with a QR code, a line code and a DWM as data carriers on the back of the card, which support an accurate decoding of the credential bearer's identity and then the assessment of the facial picture, which is sent to the server and thus begins the final step in the process of confirming the individual's identity using the facial recognition of the template stored on the server.

With this step, the individual reading the QR code from card has the name of the person holding the credential and a phase of identity proofing has been delivered. Alternatively, or in addition, there may be a second step whereby a photo of the card holder is taken with the same mobile phone which also is sent to the authentication server. In this configuration, the server analyzes a picture of the card holder and creates the facial template from the pic and compares the template to the one stored in the server. If a match or appropriate confidence level may be secured, then the identity of the card holder is verified and the verification is sent back to the person who took the picture.

The information and/or proof of verification can then be sent to one or more remote users. In one configuration, this information is used to authorize access to a physically-restricted space.

A variety of templates may be used. For example, instead of facial recognition, a wireless device also may be configured to take a picture of the finger of the card holder (at a resolution that is acceptable for the use case) or use a new smart phone with a finger print reader built into it. The validation also may account for differences in ambient lighting of the present environment compared to the lighting and optical performance of the environment in which the biometric template was developed. These ambient differences may be used to adjust the threshold at which a positive correlation is developed. For example, if useful biometric aspects appear are undiscernible because of ambient lighting, the threshold may be revised to account for these differences.

A "user" may refer to an individual. For example, a user may be an individual with a physical identification card that may be a driver's license issued by a department of motor vehicles of a territory or a municipality. In other instances, the identification card may be other types of identifications such as a social security card, a passport, a birth certificate, medical record or insurance card, or other government or company-issued identification cards.

A user may be provided with a record in a digital identification infrastructure by enrolling into an enhanced digital identification program offered by a digital identification administrator. In some instances, the digital identification administrator may also be the issuing authority. In other instances, the digital identification administrator may be another organization that is authorized by the issuing authority to manage the issuance and maintenance of physical identification cards.

A user may opt to enroll into the enhanced digital identification program using various methods such as, for example, an online enrollment process, a form submission, or through an oral agreement with an authorized representative. The digital identification administrator may then create a user entry including user information in a digital identification database. For instance, the user information may include one or more of an email address, an identification number, a user photograph, and other types of demographic information (e.g., home address) associated with the user. The digital identification database may also indicate to the digital identification administrator that an entry for the user has been successfully created once the entry for the user has been created. Thus, the infrastructure, that is, the online records, may be created even as the user receives a physical identification document that is configured to interface with digital infrastructure.

The enrollment process for the identification program may include the use of various methods to receive user information, such as, for example, the use of email, the use of a user token such as a personal identification number (PIN), and/or the use of user biometric parameters. A user may thus be given visibility into one or more components of the records and information that goes into the digital infrastructure that is then later linked to their record.

FIG. 1A illustrates a block diagram of an example system 100 for inspecting a physical identification document 132. In general, the system 100 may be used for various processes associated with a physical identification document 132. For instance, the system 100 may be used to initially enroll users into an enhanced digital identification program, and provision a physical identification document 132 to enrolled users.

Briefly, the system 100 may include a digital identification server 110, an issuing authority server 120, and a interrogating device 130 connected over a network 105. The digital identification server 110 may also be configured to exchange communications with a digital identification database 112. In addition, the interrogating device 130 may display a physical identification document 132 on a user interface presented to a user (e.g., a user or any other authorized user) on the interrogating device 130. Although the physical identification document 132 is depicted as a digital driver license in FIG. 1A, the physical identification document 132 may alternatively be a digital form of any physical identification card issued to a user from various types of identification issuing authorities (e.g., a government agency or a company).

The system 100 may be used to periodically assign and update a security status associated with the physical identification document 132 of each enrolled user. The security status associated with the physical identification document 132 may be a set of configuration settings that are initially set to fabricate and later read the physical identification document 132. For example, a security status received by a interrogating device 130 from the digital identification server 110 may specify that when the physical identification document 132 is read by the interrogating device 130 on a Monday, the physical identification document 132 include a first credential data, and when the physical identification document 132 is inspected by the interrogating device 130 on a Tuesday, the physical identification document 132 is inspected to read different, second credential data from a second region or in a second manner (e.g., selection of frequencies). Credential data may refer to information that is used to verify validity of user information. For example, credential data may include a particular image, a particular verification phrase, or a checksum of user information calculated with a particular checksum algorithm.

In another example, the security status may be used by the digital identification server 110 to indicate on the interrogating device 130 whether the physical identification document 132 is "valid" or "invalid" based on a verification procedure performed by the digital identification server 110. In other examples, the security status may be inspected to ascertain the presence of a set of user credential data that is associated with the physical identification document 132. The user credential data may refer to user-specific information used to verify the authenticity of the physical identification document 132 and/or prevent fraudulent or unauthorized access of the physical identification document 132. For instance, as described more particularly in FIG. 1B, the user credential data may be used with various security level protocols of the physical identification document 132 where each level uses a different set of credential data and different detection techniques to identify the credential data for use in the verification of the physical identification document 132.

In yet another example, the security status may be read by the digital identification server 110 to ascertain different instantiations of credential information appearing within the physical identification document 132 as determined by the interrogating device 130. When selecting from amongst multiple fields, the interrogating device 130 may derive this information, for example, based on the GPS location of the interrogating device 130. In still another example, the security status may be used to adjust the access to specific information that is read and provided from the physical identification document 132 based on the particular application of use (e.g., identity verification, age-restricted product access).

Additionally or alternatively, the security status may be used as a pattern of different user credential data used to derive a time-variant derived determination of information appearing within the physical identification document 132. For example, the security status may specify a combination of user credential data and values for each credential data. In such implementations, the security status may be used by the digital identification server 110 to detect patterns that indicate abnormal activity of the physical identification document 132 (e.g., fraudulent use indicating by improper user credential data).

Accordingly, in some implementations, the security status may specify different sets of user credential data to be used under different conditions, and the interrogating device 130 may update the security status based on information from the digital identification server 110.

The set of security protocols may be additionally used to resist against unauthorized simulation of or access to the physical identification document 132. In addition, the set of security protocols may enable the verification of the physical identification document 132 by authorized users such as, for example, transportation security officials, law enforcement officials, and/or other authorized personnel associated with the issuing authority.

In more detail, the network 105 may be configured to enable electronic communications between the digital identification server 110, the issuing authority server 120, and the interrogating device 130. For instance, the network 105 may include Local Area Networks (LANs), wide area networks (WANs), Wi-Fi, or analog or digital wired and wireless networks. The network 105 may include multiple networks or subnetworks, each of which may include, for example, a wired or wireless data pathway. The network 105 may also include a circuit-switched network, a packet-switched data network, or any network capable of carrying electronic communications (e.g., data or voice communications). For example, the network 105 may include networks based on the Internet Protocol (IP), or other comparable technologies.

The digital identification server 110 may be a remote server that is monitored and operated by an organization or institution that is authorized by an identification issuing authority to provide the physical identification document 132 to a user. In some instances, the organization or institution operating the digital identification server 110 may be an organization that is designated by the identification issuing authority to access identification information for a plurality of users who have been issued a physical identification card. In other instances, the organization or institution operating the digital identification server 110 may be the identification issuing authority (e.g., a government institution) that issues a plurality of users with a physical identification card.

The digital identification server 110 may coordinate and administer the backend processes that are involved in provisioning an enhanced services on behalf of a plurality of users that have been issued a physical identification from the identification issuing authority. For instance, the digital identification server 110 may initiate processes to enroll users with the physical identification document 132, and operate security protocols to detect potential fraudulent use or privacy breaches associated with the improper access to identification information. In some instances, the processes related to the physical identification document 132, as described above, may be coordinated with the issuing authority server 120, to ensure that secure user information that includes personally identifiable information are not exposed during the provisioning of the physical identification document 132.

As described, secure user information may refer to user information within the physical identification document 132 that may include personally identifiable information associated with the user such as, for example, social security numbers, place of residence, and/or other demographic information that is associated with other types of information that the user considers private. In addition, the secure user information may include medical records of the user that are protected under the Health Insurance Portability and Accountability Act of 1996 (HIPAA). Access to the secure user information within the physical identification document 132 may be restricted by the digital identification server 110 by the using particular authorization procedures (e.g., requiring of user access codes by the operator of 130).

The digital identification server 110 may exchange communications with the digital identification database 112, which includes user information for enrolled users and/or other configuration details related to the enhanced digital identification program (i.e., configuring a physical identification document to interface with a digital identification infrastructure). For instance, the digital identification database 112 may include a user entry associated with a user that includes account information associated with enrolled users, and any type of user information that may be provided by the user during a digital identification enrollment process.

In some implementations, the digital identification database 112 may include user entries for both users that are enrolled in the enhanced digital identification program and potential users that the digital identification server 110 has identified as users that are likely to enroll in the enhanced digital identification program. For example, the digital identification database 112 may include a field that indicates whether a user entry is associated with an enrolled user or a potential user. In such implementations, the digital identification database 112 may be accessed by the digital identification server 110 to retrieve user information for the physical identification document 132 associated with an enrolled user, and user information for a candidate user in order to send an enrollment email that provides an enrollment code to the candidate user.

In some implementations, the user entry for enrolled users may be automatically created by the digital identification server 110 within the digital identification database 112. In such implementations, the user may submit an online enrollment form including a set of user fields for providing user information. In response, the digital identification server 110 may initiate a computer-implemented procedure that automatically generates a user entry for the user in the digital identification database 112 and inserts the values submitted for the set of user fields as user information that is included in the user entry.

In addition, the digital identification database 112 may include security status information associated with the physical identification document 132, which is accessed by the digital identification server to assign a security status to the physical identification document 132 at particular time periods. For instance, the security status information may specify the set of user credential data that is read from the physical identification document 132, and an indicated time frame when each user credential data was generated by the digital identification server 110. In one example, the security status information may specify the values of user credential data such as access codes or user-selected passwords associated for the physical identification document 132. In another example, the security status information may specify configurations for executing the security protocols to verify the physical identification document 132. In yet another example, the security status information may include a set of instruction files that may be transmitted to interrogating devices used to verify the physical identification document 132 that is displayed on the interrogating device (e.g., a LEO system).

In some implementations, the digital identification server 110 may additionally exchange communications with an image server, which stores photographs associated with a user identification card. In some implementations, the image server may be operated by a separate entity or organization that operates the digital identification server 110. For instance, in such implementations, the image server may be operated by the identification issuing authority. In other implementations, the image server may be operated by the authorized issuing authority that also operates the digital identification server 110. In such implementations, the image server may be a sub-component of the digital identification server 110.

The issuing authority server 120 may be a remote server that is operated by the issuing authority and used to control access to secure user information that is included in physical identification cards issued by the issuing authority. For instance, the issuing authority server 120 may provide access to demographic information of users, historical information associated with users (e.g., previous identification cards issued, number of renewals, etc.), and/or other types of user information using authorization procedures that require validation of access credentials. For example, upon receiving a request for the secure user information by the digital identification server 110, the issuing authority server 120 may require an exchange of the access credentials to validate an authorized request.

The issuing authority server 120 may be queried by the digital identification server 110 for secure user information during a digital identification operation. For instance, during an enrollment process, after a user has opted to enroll into an enhanced digital identification program, the digital identification server 110 may query the issuing authority server 120 using a user identifier number to extract secure user information to be included in a generated physical identification document 132. In another example, during a verification operation, the digital identification server 110 may access the issuing authority server 120 to determine whether a physical identification document 132 for a user features information indicative of a fraudulent physical identification document 132.

In some implementations, the issuing authority server 120 may be configured with additional security protocols compared to the digital identification server 110 to protect sensitive user information associated with the user. For instance, in some instances, the issuing authority server 120 may be associated with a Federal government agency that manages nationwide programs that require specialized access (e.g., a government clearance). In such instances, the digital identification server 110 may be configured to access the secure user information stored within the issuing authority server 120 under a special security agreement that ensures that the exchange of the secure user information is controlled and regulated according to Federal privacy statutes. For example, the issuing authority server 120 may track information related to each exchange with the digital identification server 110 such that in the event that the digital identification server 110 determines that a particular physical identification document 132 is invalid, a notification may be received by the issuing authority server 120 to take additional security measures to protect more sensitive user information that may be associated with the physical identification document 132. In this regard, the communication exchange between the digital identification server 110 and the issuing authority server 120 may be utilized to ensure protection of user information beyond the user information included in the physical identification document 132.

The interrogating device 130 may be a portable electronic computing device that displays the physical identification document 132 associated with a user. For instance, the interrogating device 130 may be, for example, a smart phone, a tablet computer, a laptop computer, a personal digital assistant device, an electronic pad, a smart watch, a smart glass, or any electronic device with a display that is connected to a network. Alternatively, the interrogating device 130 may include a specialized LEO device that is configured to act in a high assurance manner with tamper resistant controls (e.g., operator PIN codes), and support a LEO POV ("point of view") camera.

The interrogating device 130 exchanges communications with the digital identification server 110 to receive and transmit enrollment and identification document information related to the enhanced digital identification program, user data that is included in the physical identification, credential data used to verify the authenticity of the physical identification document 132, and/or configuration settings that adjust the display of the physical identification document 132 on the interrogating device 130. For example, during an online enrollment process, the user may use the interrogating device 130 to input user information and an assigned access code for the enhanced digital identification program, which is then transmitted to the digital identification server 110 to generate the physical identification document 132. In another example, during a verification process, when the physical identification document 132 is enabled on the interrogating device 130, a data packet including credential data may be transmitted to the digital identification server 110 to determine whether the physical identification document 132 is still valid or includes accurate information. In this example, if the digital identification server 110 determines that the credential data is valid, then the physical identification may be determined to be valid. Alternatively, if the digital identification server 110 determines that the credential data is not valid, then the physical identification document 132 is labelled as invalid. This, in turn, may modify records on a server as well as generate an alarm on a notification device.

In some implementations, the interrogating device 130 may include a mobile application used by a LEO that exchanges communications to the digital identification server 110 as an application server. For example, the mobile application may be associated with a user account that is stored on the digital identification database 112. In addition, the mobile application may periodically exchange information related to the security status assigned by the digital identification server 110 to determine whether the physical identification document 132 is valid.

The physical identification document 132 may be displayed on a user interface on the interrogating device 130. For example, as shown in FIG. 1A, the physical identification document 132 may include a photograph of a user, a user identifier, categorical data (e.g., identification classification), demographic information (e.g., sex, height, eye color, home address), date of birth, etc.), and issuance information associated with a corresponding physical identification card. In some instances, the digital identification record stored in the online database mimics information appearing in the corresponding physical identification card.

In some implementations, the physical identification document 132 may include one or more security protocols that utilize user credential data to verify and validate the physical identification document 132. For instance, the physical identification document 132 may include user credential data that include a set of visual indicators such as, for example, pattern overlays, holograms, or other types of graphical information that are visually detectable by human eyes. In other instances, the physical identification document 132 may include user credential data that include a set of indicators that may not be detectable by human eyes but are optically detectable by a detector device that is capable of using light detection and manipulation techniques to extract information related to the set of indicators.

In addition, user credential data may be included in the physical identification document 132 based on an accredited security status encoded in the physical identification document 132. For example, the security status may designate an expected user credential within the physical identification document 132, such that either an authorized user (e.g., a law enforcement officer, or other individual using the physical identification to verify the identity of the user) or a detector device may compare a security feature displayed on the physical identification to the expected security feature to determine if the physical identification document 132 is accurate and verified.

Figure 1B:
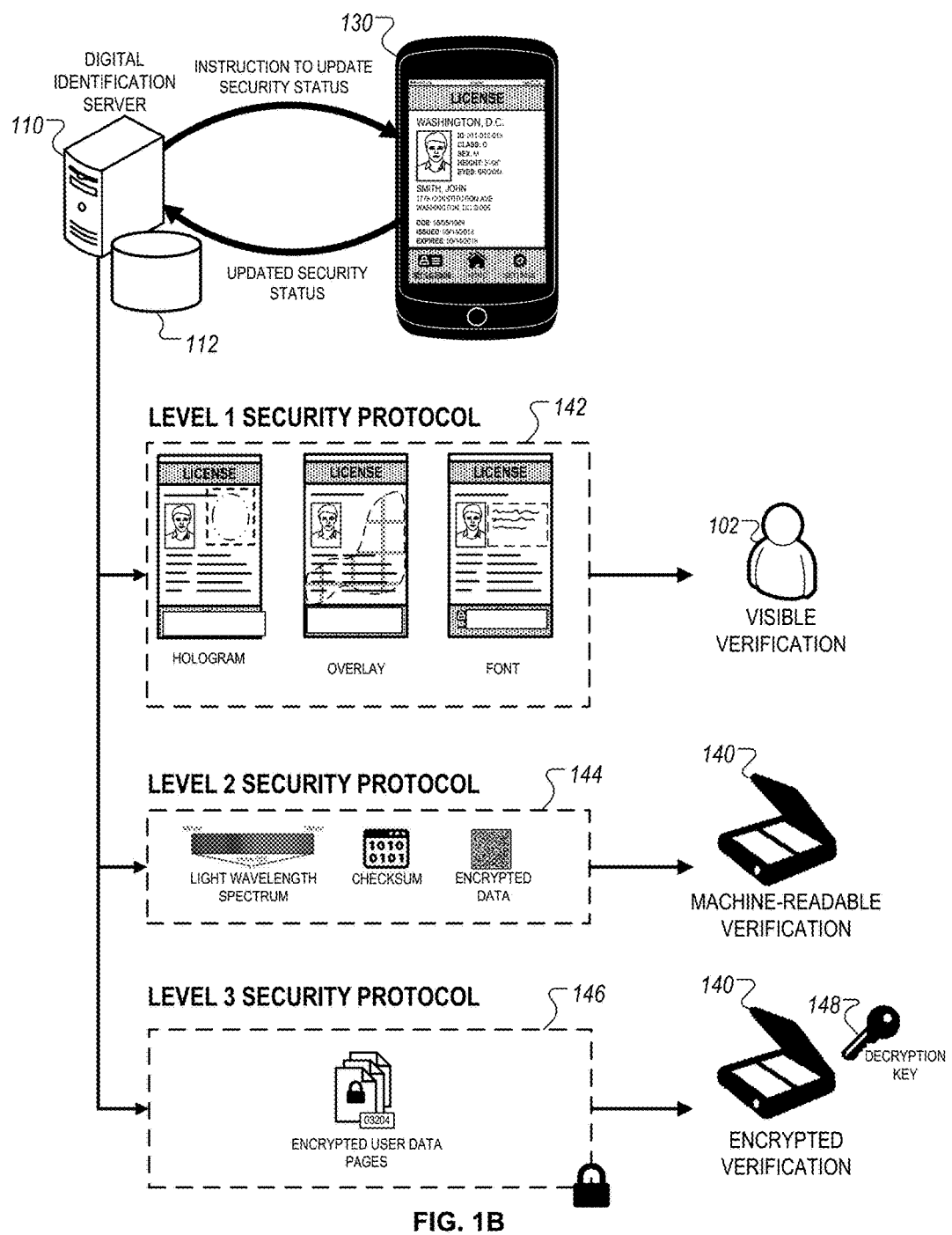
FIG. 1B illustrates example security protocols of enhanced physical identification documents.

FIG. 1B illustrates exemplary security features of a physical identification. In general, the digital identifications server 110 and the interrogating device 130 may regularly exchange communications to update the security status of the physical identification document 132. physical identification document 132

The digital identification server 110 may be configured to support the interrogation of different levels of physical security features to protect user information in the physical identification document 132 against fraud and counterfeiting. For instance, the digital identification server 110 may implement a set of level one features 142, a set of level two features 144, and a set of level three features 146.

In general, the level one security protocols 142 may include visible indicators that are displayed on the physical identification document 132 such that the visible indicators are detectable by human eyes. For instance, the visible indicators displayed on the physical identification document 132 may be visually detected by an authorized user 102 (e.g., security personnel outside a restricted area, a law enforcement officer, etc.) and verified against an expected visual indicator for the physical identification document 132.

Security protocols may include user credential data, included within the physical identification document 132, that are visually imperceptible to humans but detectable with the use of a detector device 140. For instance, the detector device 140 may use optical scanning techniques to detect the user credential data, digital processing techniques to extract embedded payloads printed in a card, pattern recognition techniques to detect displayed patterns (e.g., QR or 2 dimensional bar codes), or other common forms of data authentication techniques employed in secure transactions.

In some instances, the detector device 140 may be capable of performing machine recognition techniques such as, for example, optical character recognition, optical word recognition, intelligent character recognition, or other forms of pattern recognition to identify features of interest within a captured image of the physical identification document 132. In such instances, the detector device 140 may initially receive a pre-processed image of the physical identification document 132, and then receive pattern data indicating the features of interest from the digital identification server 110. Using the trained pattern data, the detector device 140 may then recognize the features within the pre-processed image of the physical identification document 132 based on performing machine recognition techniques.

In some implementations, the level two security protocols 144 may use multiple layers that are detectable to the detector device 140. For instance, the layers may include different sets of graphical information, or a subset of graphical information associated with an overall graphic associated with user credential data. For example, the graphic information may include art, font, microprint, holograms, or combinations of the different graphical information. In such implementations, the detector device 140 may receive a set of instructions from the physical identification document 132 to extract individual layers based on the use of visual filters to select specified layers of interest that may include user credential data. In other examples, other light manipulations techniques may be applied to one or more of the layers to analyze the graphical information of the indicators within the physical identification document 132.

In some implementations, the level two security protocols 144 may include rendering user credential data from user information within the physical identification document 132. For instance, the digital information may include encrypted payloads resident in printed information with demographic and portrait data of the user associated with the physical identification document 132, information related to the security status of the physical identification document 132, or other types of encoded information. In other instances, the digital information may include a quick response (QR) code that is provided to the detector device, and used to retrieve user information.

The level three security protocols 146 may include encrypted user data pages that include secure user information from the physical identification document 132. For instance, user data generated on the interrogating device 130 may be periodically transferred to the digital identification server 110 to update the security status and/or maintain updated credential information associated with the user. The digital identification server 110 may encrypt the user data pages generated on the interrogating device 130 using a key maintained or paired with the digital identification server 110. The encrypted user data pages may additionally be provided to the detector device along with a decryption key 148 to enable the detector device 140 to decrypt the encrypted user data pages and extract decrypted data payloads that include secure user information.

In some implementations, the level three security protocols 146 may include the use of a checksum associated with the encrypted user data pages to verify the secure information included in the encrypted user data that has been printed or rendered onto the identification document. For instance, the checksum may include a timestamp that is used to identify when the security status of a particular data page was associated with the digital identification server 110. The timestamp in the printed checksum may then be cross-referenced against the last identified checksum within the digital identification database 112 to determine if the particular encrypted information reflects user information according to the most recent security status designated by the digital identification server 110.

In some implementations, a set of images may be processed by the digital identification server 110. In such implementations, the digital identification server 110 may compare the set of two dimensional images to a set of reference feature templates that include features that indicate a facial image. In this regard, the digital identification server 110 may use pattern recognition techniques to process captured of facial images based on the features included in the reference feature templates.

The depth map for each image within the set of images 222 may then be compared to determine correspondences between individual depth maps for two or more features. For instance, a matching procedure where a plurality of depth maps are compared to identify matching elements within the plurality of depth maps may be used. The matching elements may be features within the depth maps that have similar depth information, indicating a high likelihood that they represent the same facial feature within different two dimensional images of different viewing angles.

In some implementations, the matching procedure may be iteratively performed such that the depth map of each individual image within the set of two dimensional images is compared to the depth map of every other respective image within the set of images. In other implementations, each image within the set of images may initially be assigned to a certain category based on the viewing angle of the face within the image, and then the depth map of each image may be compared against the depth maps of other images that are assigned the same category. For example, if the set of images 222 includes left view images, right view images, and front view images, then the matching procedure may be performed such that the depth map of a left view image is only compared to other depth maps of left view images.

Figure 2:
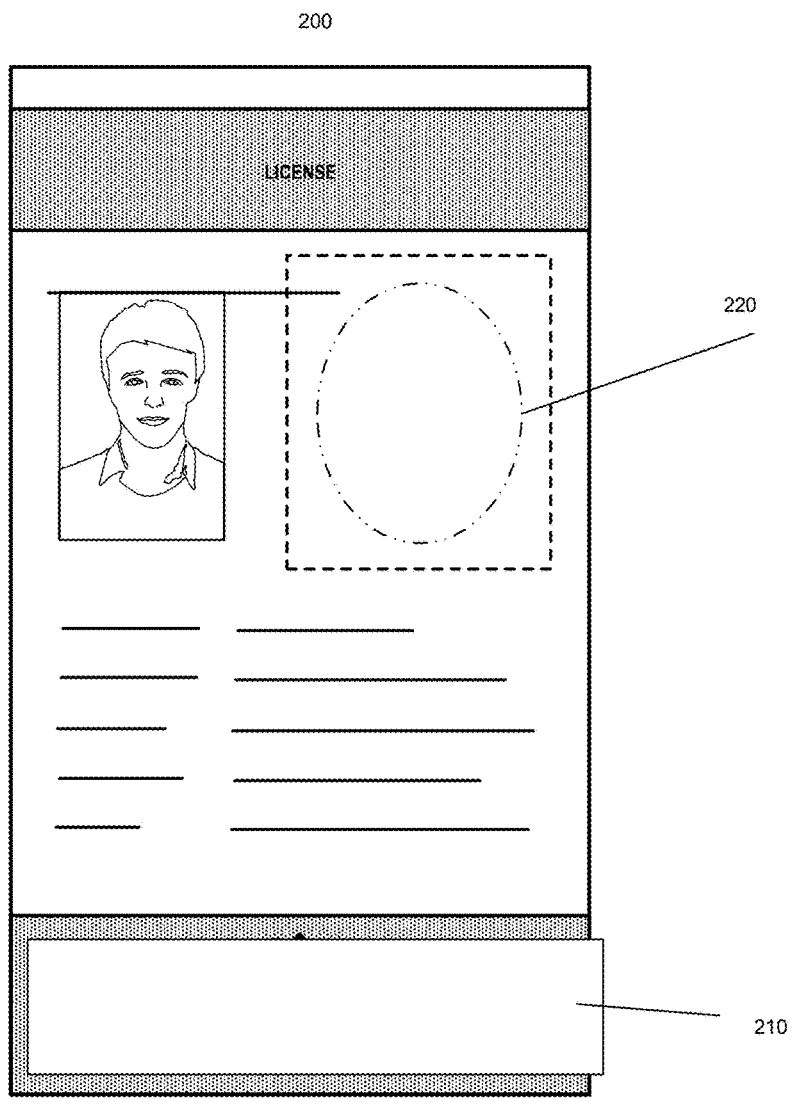
FIG. 2 illustrates a layout of an enhanced physical identification document.

FIG. 2 illustrates a layout of an enhanced physical identification document 200 with reference information 210 and a second portion of information 220. The reference information 210 includes information used to retrieve information from an online server and may include a QR code, a 2D bar code, or other information used to provide a label for an interrogating device to retrieve additional information.

The second portion of information 220 may include one or more additional indicia obfuscated from easy inspection by encoding in a way such that encoded information can only be easily read by retrieving additional information from a server. In one configuration, the second portion of information includes biometric information used in the calculation to perform a biometric check. In another configuration, the second portion also reveals sensitive PII. The second portion of information may be encoded in an image or written within or over other information in an obfuscated manner (e.g., the same 2D bar code used to retrieve reference information) such the second portion of information occupies the same physical real estate as other information but residing at a different level.

Figure 3A:
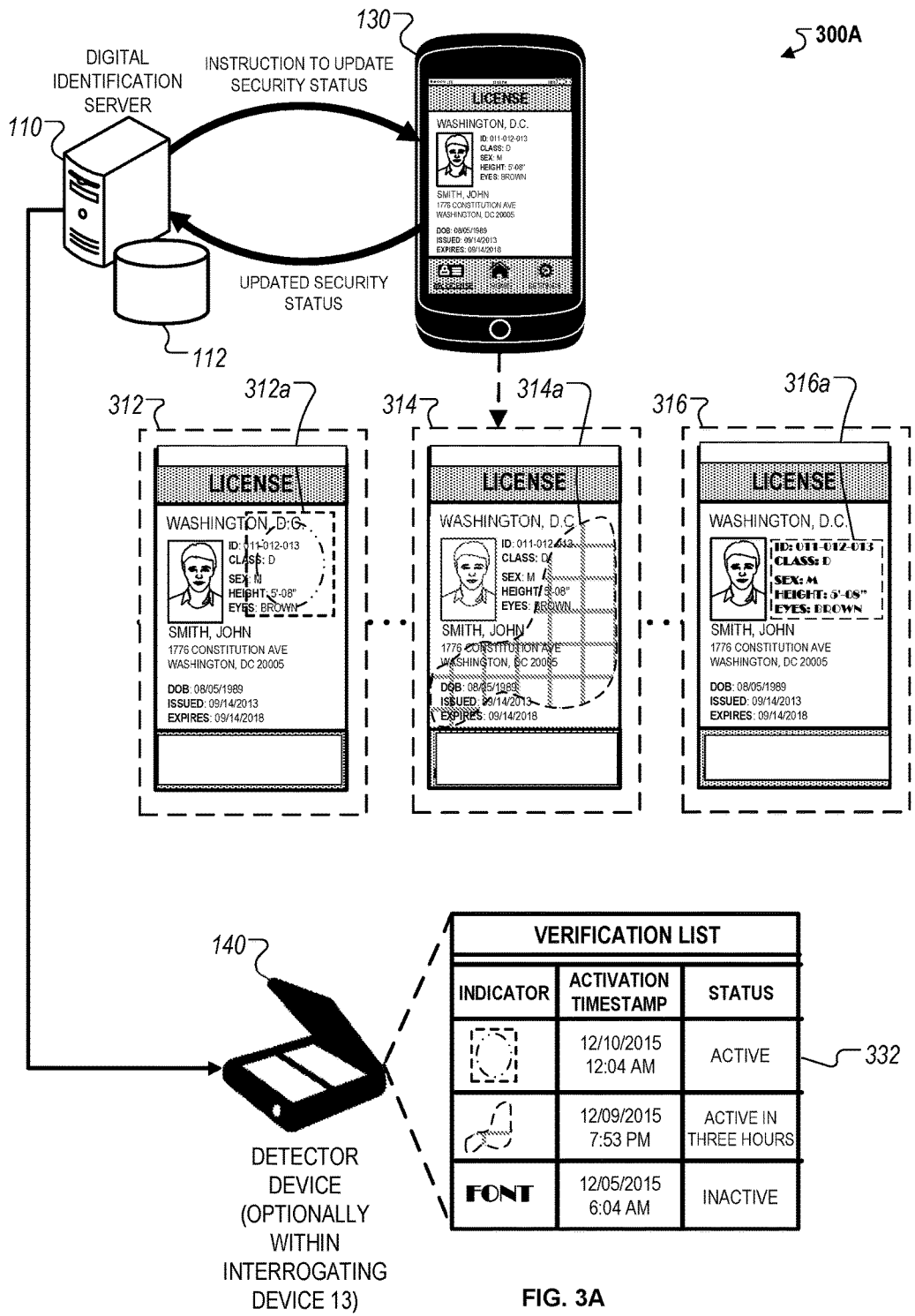
FIG. 3A illustrates a block diagram of an example system using variable visual indicators that may be displayed in an enhanced physical identification document.

FIG. 3A illustrates example visual indicators 312*a*-216*a* that may be displayed on the physical identification document 132. Briefly, the interrogating device 130 may exchange communications with the digital identification server 110 and generate a set of physical identifications 312-316, which may include visual indicators 312a-316a, respectively. In some instances, the digital identification server 110 may additionally transmit instructions to the detector device 140 that include a verification list 332 which may allow the detector device 140 to detect the visual indicators 312a-316a or notify a user of the detector device 140 what visual indicator to expect on the physical identification document 132.

The identifications 312-316 may represent different aspects of the physical identification document 132 on the interrogating device 130. These different aspects may be read based on the security status assigned to the physical identification document 132 by the digital identification server 110. For instance, as described in FIG. 1B, the security status may include an instruction to display a particular visual indicator on the physical identification document 132 based on various conditions. In one example, the security status may associate a particular visual indicator to be displayed on the physical identification document 132 based on a time (e.g., reading one aspect or configuration for the morning, and another aspect for the night). In another example, the security status may associate a particular visual indicator (or aspect) to be read on the physical identification document 132 based on the type of identification of the physical identification document 132 (e.g., one visual indicator for a digital driver license, and another visual indicator for a driver's license being employed for a physical access control system). In this regard, the visual indicators may be used to easily identify a different security information that is currently associated with the physical identification document 132.

In some implementations, the digital identification server 110 may assign a particular security aspect to the physical identification document 132 that is read as a particular visual indicator based on the user information included in the physical identification document 132. For instance, the digital identification server 110 may be configured to read particular security information including a specific visual indicator that is read based on the presence of certain information within the physical identification document 132 or based on the type of security check that is read by the interrogating device 130. In one example, if user information within the physical identification document 132 indicates that the physical identification document 132 may be used for a high security applications (e.g., an identification related to national security), the digital identification server 110 may assign a particular security status check to be performed by the interrogating device 130 that scans for a particular visual indicator with a complex graphical pattern that is difficult to replicate. In another example, if the user information within the physical identification document 132 indicates that the user has previously had security issues with other identification documents, the digital identification server 110 may similarly assign a security status with a complex graphical pattern to protect susceptible users from subsequent security breaches in future optical interrogations of the physical identification document 132. In this regard, the visible indicators read from within the physical identification document 132 may be configurable based on the user information associated with the online digital identification, enabling the ability to dynamically adjust how the physical identification document 132 is interrogated in order to protect against security breaches that are confined to one or more security domains. For example, different watermarks may be present through a physical identification document 132. The different portions may be selectively relied upon based on a server-based determination that one or more security measures have been compromised.

The visual indicators 312a-316a may represent different types of visual indicators that may be rendered within and read from the physical identification document 132. For instance, the visual indicator 312a may be an overlay graphic, the visual indicator 314a may include backdrop graphic, and the visual indicator 316a may be a font graphic.

The visual indicator 312a may be include an overlay graphic that is part of a set of transparent layers displayed on the physical identification document 132. For instance, the visual indicator 312 may include one or more patterns that are combined in multiple layers to generate a complex graphic with information that is operable at multiple levels and is uniquely identifiable within the physical identification document 132. For example, as shown in FIG. 3A, the visual indicator 312a includes an oval graphic that is superimposed on a rectangular graphic. In this example, the oval and the rectangular graphics represent different transparent layers that are combined to generate a uniquely identifiable pattern. These different layers may be selectively filtered by an interrogating device 130 in order to reveal different information rendered into the physical identification document 132

In some implementations, the capture of specific uniquely identifiable pattern represented by the visual indicator 312a may be adjusted by the digital identification server 110 using a time-based schedule. In such implementations, the digital identification server 110 may store different security statuses 322 that each include different permutations of the visual indicator 312a (e.g., different graphics, different portions of an optical spectrum), and may assign different security statuses 322 to the physical identification document 132 based on the time-based schedule such that the various permutations of the visual indicators 312a based on the time. In this regard, the particular floating overlay graphic that is displayed on the physical identification document 132 may be variably selected based on the assignment of different security statuses 322.

The visual indicator 312a may be displayed on various regions of the physical identification document 132. For instance, as shown in the example in FIG. 1A, the visual indicator 312a may be displayed in a specific region that includes highly important user information (e.g., ID number, ID classification) to direct a user's attention to such user information for verification. Alternatively, the visual indicator 312a may be displayed on other regions of the physical identification document 132. In some implementations, in addition to the security status specifying a particular visual indicator to display on the physical identification document 132, the security status may include a spatial coordinate to place the particular visual indicator such that the placement of the visual indicator may also be variably specified by the security status.

The visual indicator 314b may feature a backdrop that is displayed or rendered within the background of the physical identification document 132 such that user information overlaying the visual indicator 314b may still be visible. For instance, the visual indicator 314b may be a static image that includes a single graphical representation. The visual indicator 314a that is printed onto a physical identification document may be used to customize the overall appearance of the physical identification document 132 based on the security status assigned by the digital identification server 110 as the physical identification document is fabricated.

In some implementations, the visual indicator 312a and 314a may include issuer-specific graphical representations to be displayed on the physical identification document 132. For instance, the graphical representations may include specific logos or images that identify the issuing authority such that an authorized user that visually verifies the physical identification document 132 may more easily identify the issuing authority associated with the physical identification document 132.

The visual indicator 316a may be a deliberate character alteration that adjusts the display of characters shown on the physical identification document 132. For instance, as depicted in FIG. 3A, in some instances, the font of specific characters may be deliberately adjusted based on an anticipated verification operation to be performed on the digital identification (e.g., verification of the user's date of birth), or based on a pattern that is used indicate whether the physical identification document 132 is authentic. For instance, the assigned security status may specify which particular characters are to be altered, and the method of alteration such that the digital identification server 110 may variably adjust different characters shown on the physical identification document 132 based on a particular assigned security status.

As described previously, the security status assigned to the physical identification document 132 by the digital identification server 110 may specify user credential data to be included in the physical identification document 132. In some instances, the security status may additionally designate a portion of the user information as low security user information, and a portion of the user information as secure user information. For instance, as described previously, the secure user information may be information that the user may consider private information. For example, as is shown in FIG. 1A, the security status may designate the license ID, the name, address, and the date of birth secure user information, and the user sex, height, and eye color as low security information.

The secure user information within the physical identification document 132 may be encrypted by the digital identification server 110 using the access credential. The access credential may be encoded using private key and assigned to the user to enable access to secure user information displayed within the physical identification document 132.

In other instances, information embedded on a physical access identification document 132 may include other types of user credential data such as, for example, a registered fingerprint of the user, a retina pattern of the user, a user-selected personal identification number (PIN), or a user specified password In some implementations, the interrogating device 130 may include a mobile application that is used to provide access to the physical identification document 132. For instance, as shown in FIG. 4A, a user may initially provide a user input over the icon 412, which may launch the mobile application on the user device and display the screen 414a on the interrogating device 130. The screen 414a may include a list of digital identifications associated with the user. In some implementations, the screen 414a may include multiple digital identifications that are each associated with a different issuing authority (e.g., a digital driver license issued by the department of motor vehicles, and a social security card issued by the social security administration).

The user may then provide a user input selecting a particular digital identification residing on a digital identification server 110 on the screen 414a and then be redirected to the access screen 414b. The access screen 414b may be a lock screen that requests the user to submit user credential data in order to provide access to encrypted secure user information included in the physical identification document 132. For instance, the submitted user credential data may include biometric identifiers of the user (e.g., a registered fingerprint or a retinal pattern), or a user-selected access credential (e.g., a user-specified PIN code, or a user password). The user may then provide a user input including user credential data.

In some implementations, the access screen 414b may be configured to accept other types of user input. For example, the access screen 414b may include a skin texture analysis (STA) module where a user may place appendages (e.g., fingers) on the screen of the interrogating device 130. For example, the STA may include analyzing features such as skin patterns. In other implementations, the screen 414a may be configured to perform facial recognition of a captured image submitted by the user.

The access screen 414b may be used to protect access to secure user information included in the physical identification document 132. For example, by requiring user credential data that is associated with biometric identifiers of the user, the access screen 414b may enable protection against unauthorized access to secure user information in circumstances where the user may have lost the interrogating device 130. In such examples, if the interrogating device 130 receives a simulated credential (e.g., a falsified STA template), the interrogating device 130 may transmit an indication to the digital identification server 110, and verification techniques using additional user credential data may be used as a secondary authentication process to provide access to the secure user information.

After receiving the user input including the user credential data, the interrogating device 130 may then verify the user credential data against the most recent access credential 424 provided by the digital identification server 110 during the most recent security status update. For instance, in some instances, the access credential 424 may include a set of features that are compared against the received user credential data in order to determine whether the user-submitted credential data is valid. If the user-submitted user credential data, as entered on the interrogating device, does not match the feature templates included within the access credential 424, the interrogating device 130 may determine that the user has provided invalid user credential data, and a notification indicating the failed attempt may be transmitted to the digital identification server 110. If the user-submitted user credential data matches the feature templates included in the access credential 424, the interrogating device 130 may determine that the user has provided valid user credential data in the physical identification document 132.

In some implementations, if greater than a threshold number of failed attempted have been made against an online record for the user, the interrogating device 130 may transmit a notification indicating the number of failed attempts to the digital identification server 110 and in response, the digital identification server 110 may dynamically update the security status of the record for remote interrogating devices to prevent further access attempts using the submitted credential data, and to further secure the user information included in or related to the physical identification document 132. In other implementations, instead of updating the security status, the digital identification server 110 may instead provide a notification to the user through networked means requesting to verify that the individual using the user device to access the secure user information is in fact the user. For example, the valid bearer of the physical identification document 132 may receive a text indicating that their online record is being polled with requests that fail to pass validity checks.

Figure 4:
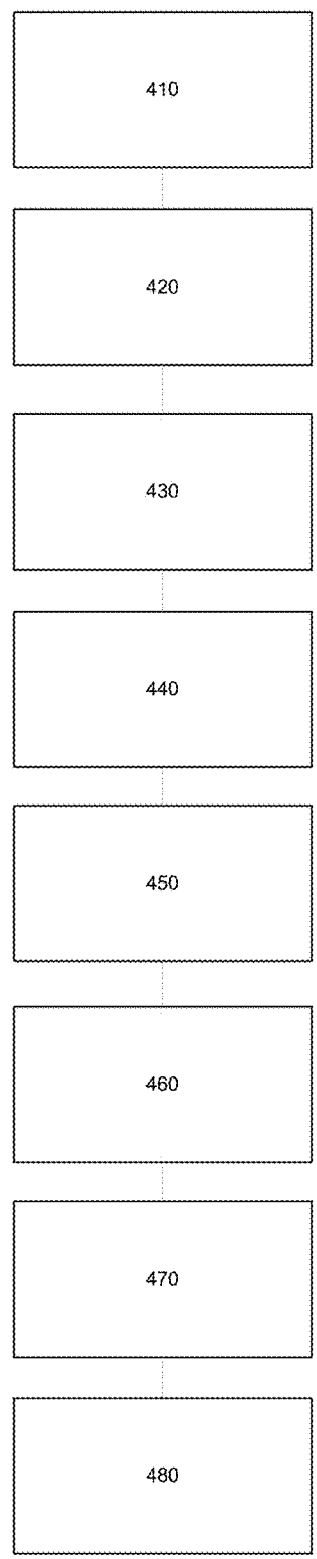
FIG. 4 is a flow chart of a process by which physical identification documents may be inspected.

FIG. 4 is a flow chart of a process 400 by which physical identification documents may be inspected. Generally, the systems and operations may be performed using the systems described above.

The system reads, via machine readable information and on an interrogation device, reference information from an identification document (410). For example, a LEO may use an ID inspection application resident on a wireless device to optically scan a driver's license using a camera on a wireless device. The camera may read a 2D bar code from the driver's license. The 2D bar code may display a record identifier on a state database that is used to reference an enhanced record for the user's identifier.

The interrogation device then configures a request to a host configured to support a second stage of processing of the identification document based on the machine readable information (420). The interrogation device may translate the record identifier into a TCP packet with application layer information that has been encrypted based on a session key between an ID application and a state database. The wireless device may include a token indicative of the accreditation and validation of the rights of the user of the interrogation device. The wireless device may perform a degree of translation of information read from the 2D Bar code (or QR code) such that mere inspection of the QR code does not readily reveal confidential information. Alternatively, the 2D bar code may include a driver's license serial number and other information designed to provide minimal access to the database without revealing an entire record of information for the user.

The interrogation transmits the request to the host (430). For example, a wireless device may translate an HTTP Get request if the information is accessed through the HTTP protocol, or the request may be sent through secure application tunneling across a secure connection.

The interrogation device receives, from the host, a watermark decode instruction for the second stage of processing on the identification document (440). The watermark decode instruction includes information that is used to derive information that is not ordinary readable or decipherable by the wireless device. For example, numerous watermarks may be present within a driver's license, where the watermarks may encode additional detail with a larger image (e.g., a crest appearing in the state seal and/or a slight modification of a printed image of the user). The information may include mapping information to reveal its location and/or constituent location within a larger standard map, or it may include a key used to read information from an established watermark (e.g., using public key/private mapping and/or which frequency bands should be employed to read the watermark information).

In the second stage of processing on the identification document, the watermark decode instruction is used to read a second portion of information from the identification document (450). The second portion of information may include biometric information for the user that has been encoded into the card. For example, the biometric information may include a template for a user's face and/or print information for a specified digit.

The interrogation device is used to capture a biometric signal from a user presenting the identification document (460). For example, a wireless device may use a camera to capture a facial image and/or a print of the user's hand. Alternatively, or in addition, the wireless device may feature a print reader designed to a capture a print's ridges on a digit (e.g., a right index finger). The biometric capture device may be resident within the wireless device itself or it may be associated with an external system configured to perform biometric interrogation.

The biometric signal is related to the second portion of information (470). For example, an image of the user's portrait captured by a LEO may be compared with a facial template that was decoded from the user's physical identification document that was decoded from the second portion of information.

Based on relating the biometric signal to the second portion of information, an indication of whether the user presenting the identification document has biometric characteristics related biometric data to the second portion of information associated with the identification document is provided (480). In one configuration, an ID scanning application on a wireless device for a LEO may reveal a numerical score (e.g., 90% confidence exists that the bearer of the physical identification document is the person whose biometric information has been encoded into the car). In another configuration, the application reveals a Boolean indication of whether sufficient confidence exists to determine that there is a match between both pieces of biometric information. Once biometric information has been confirmed, additional information may be made available by other systems, such as for example, enabling a LEO to inspect an enhanced record retrieved online, or by transferring aspects of a medical record to the interrogating record for those circumstances where the interrogating device is associated with a physician's office.

Figure 5A:
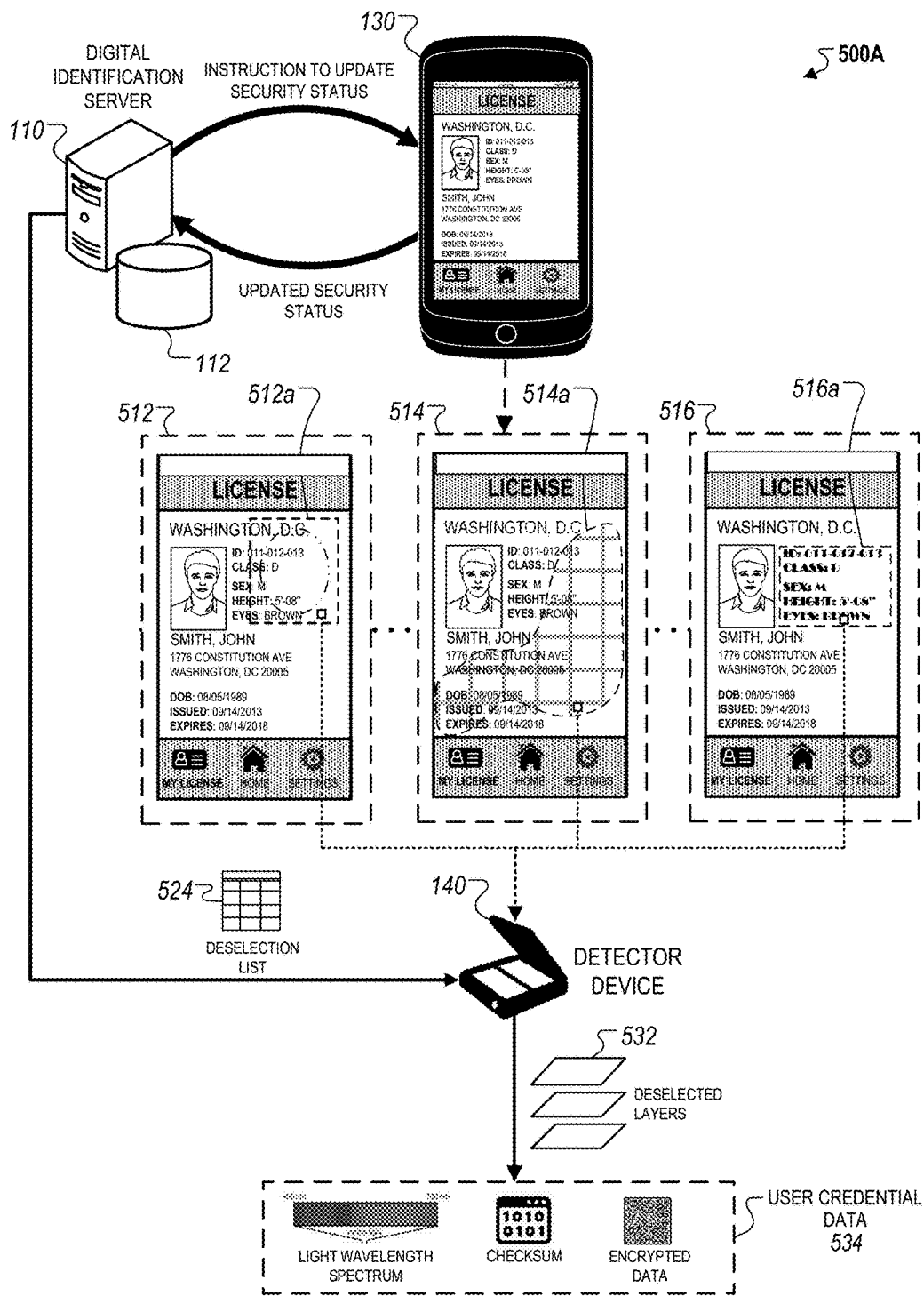
FIG. 5A illustrates a block diagram of an example system using visual indicators with embedded user credential data displayed in an enhanced physical identification document.

FIG. 5A illustrates a block diagram of an example system 500A using visual indicators 512a-516a that may be printed on the physical identification document 132. Briefly, the interrogating device 130 may exchange communications with the digital identification server 110, in order to read digital identifications 512-516 from the physical identification document 132, which may include the visual indicators 512a-516a, respectively. The visual indicators 512a-516a may be based upon multiple physical layers that are extracted by the detector device 140.

In some instances, the digital identification server 110 may transmit a deselection list 524 to the detector device 140, which may use the deselection list 524 to extract a set of deselected layers 532 that include extracted data from the multi-layered visual indicators 512-516. The deselection list 524 may indicate each of the multiple layers that are included in the visible indicators 512a-516a, and instructions for each layer to filter out an individual layer from the visible indicators 512-516. For instance, the instructions may specify the type of optical signal transmitted by the visible indicators 512a-516a, indicators included in the individual layers that specify boundaries between layers (e.g., a wavelength bandwidth within the visible light spectrum), or associated user credential data that are embedded within each layer.

As discussed previously with respect to FIG. 3A, the digital identifications 512-516 may represent different aspects of the physical identification document 132 on the interrogating device 130 configured to be selectively read based on the security status assigned to the physical identification document 132 by the digital identification server 110. For instance, the security status may include an instruction to display a particular multi-layered visual indicator on the physical identification document 132 based on various configurations employed by the interrogating device 130.

The visual indicators 512a-516a may represent different types of visual indicators that may be displayed on the physical identification document 132. In some instances, the visual indicators 512a-516a may be substantially similar to the visual indicators 312a-316 as depicted in FIG. 3A, except the visual indicators 512a-516a may include embedded printed information within an image or information band printed or manufactured in the visual indicators 512a-516a. The embedded credential data may be machine-readable credential data that is not perceptible to human eyes, but detectable by the detector device 140 using optical scanning techniques. In this regard, in additional to providing the ability to perform a visual verification of the physical identification document 132 using the level one security protocol 142, the visual indicators 512a-516a may provide additional security by providing the ability to perform a secondary machine-readable verification of the physical identification document 132 using the level two security protocol 144.

The multiple data layers of the visual indicators 512a-516a may include multiple optical features that enable the detector device 140 to detect each of the multiple data layers. For instance, the detector device 140 may use optical scanning techniques such as, for example, visual color layer filtering and/or visual color layer fusion to extract user data that is used to verify the authenticity of the physical identification document 132. For example, data may include a light-wavelength spectrum, a checksum, or encrypted data payloads.

In some implementations, the detector device 140 may include an ultraviolet (UV) transceiver to detect an UV signal transmitted from the physical identification document 132 and/or an infrared (IR) transceiver to detect an IR signal transmitted from the physical identification document 132.

The visual color layer deselection technique involves detection of the multiple layers of visible indicators 512a-516a by the detector device 140 and the separation of each individual layer to generate the set of layers 532. The detector device 140 may use the deselection list 524 received from the digital identification server 110 to initially identify each individual layer, and use an applicable optical scanning or post-capture image processing technique to filter/deselect the individual layers residing in different bands or areas.

In some instances, the visual color layer filtering may be performed by the detector device 140 under visible light limitations that are used in security authentication applications. In such instances, the detector device may use specific visual light filters to filter/select specific color layers from the visible indicators 512a-516a displayed on the physical identification document 132 but may not be visible to human eyes. In this regard, the visual color layer deselection technique may be used to extract non-visible, machine-readable user credential information that may be included in various types of visible indicators as described previously.

Each individual color layer may include particular optical characteristics and information that, when combined with the other color information, generates a cumulative graphical representation that is readable by an interrogating device 130. For instance, the contents of each individual layer may include graphical patterns that have an associated frequency ranges and/or wavelength ranges such that light filters of particular frequency and wavelength ranges may be used to separate individual layers within the cumulative graphical representation.

Examples of light filters that may be used by the detector device 140 may include absorptive or dichroic filters that are capable of filtering reflective light off the surface of the display of the interrogating device 130 in various directions. In addition, the light filters may include longpass filters to filter longer wavelengths, short pass filters to filter shorter wavelengths, or bandpass filters to filter a particular bandwidth of filters (e.g., corresponding bandwidth wavelength of an individual layer). In some instances, the passband of the bandpass filters may be configured to be narrower to wider to adjust transitions between maximal and minimal transmissions to improve layer deselection.

The graphical patterns of the individual layers may include subsets of features of the cumulative graphical representation (e.g., individual colors of a color palate of the visual indicator). Deselection of individual layers using the visual color layer deselection technique may be used to remove subsets of features associated with particular layers and generate various permutations of cumulative graphical representation with one or more layers removed from the cumulative graphical representation. In this regard, different sets of user credential data, associated with various graphical representations, may be generated using different deselection configurations (e.g., removing specific combinations of layers). As such, the visual indicators 512a-516a may be used to generate patterns of user data that may be used to verify the physical identification document 132.

The extracted user credential data 534 from the set of deselected layers 532 may include various types of user credential data that may be used to verify the authenticity of the physical identification document 132. For instance, in one example, the user credential data 534 may include a light wavelength spectrum that may be used as a digital signature for the physical identification document 132. The light wavelength spectrum may include characteristic peaks and troughs that may be compared against a reference light wavelength spectrum stored in user entry for the physical identification document 132 within the digital identification database 112.

The interrogating device 130 may update the capture of the physical identification document 132 based on the received instruction from the digital identification server. For instance, as described previously, the interrogating device 130 update the configuration that is used to read a visible indicator that is specified by the updated security status assigned by the digital identification server. For example, the instruction to update the security status for the physical identification document 132 from the digital identification server 110 may include a reference to a particular visual indicator, and in response to receiving the instruction, the interrogating device 130 may select the particular visual indicator from a list of visual indicators and update the configuration used to read the physical identification document 132 and thus read a visual indicator otherwise concealed from within the physical identification document 132.

The detector device 140 may be configured to perform a layer deselection operation based on the received indicator information, extract user credential data from obfuscated layers, and transmit the user credential data from the selected layers to the digital identification server 110 (548). For instance, as described previously, the detector device 140 may initially detect the individual layers within the visual indicators 512a-516a displayed on the physical identification document 132 based on the optical properties of the individual layers included within the deselection list 524. In some examples, the detector device may use light filters to separate the individual layers of the visual indicators 512a-512b and generate the list of deselected layers 532. The detector device 140 may then extract the credential data 534 that may be embedded within each individual deselected layer. The extracted user credential data 534 may then be transmitted to the digital identification server 110.

The digital identification server 110 may verify the physical identification document 132 and transmit the verification results for display on the detector device 140 (550). For instance, as described previously, the digital identification server 110 may compare the user credential data 534 extracted from the set of deselected layers 532 to the expected user credential data designated by the assigned security status. If the extracted user credential data 534 matches the expected user credential data that is designated by the assigned security status, then the digital identification server 110 may determine that the physical identification document 132 is valid. Alternatively, if the extracted user credential data 534 does not match the expected user credential data designated by the assigned security status, then the digital identification server 110 may determine that the physical identification document 132 is invalid. The results of the verification may then be transmitted to as a notification to the detector device 140 so that an authorized user conducting the verification can determine the validity of the physical identification document 132.

Figure 5B:
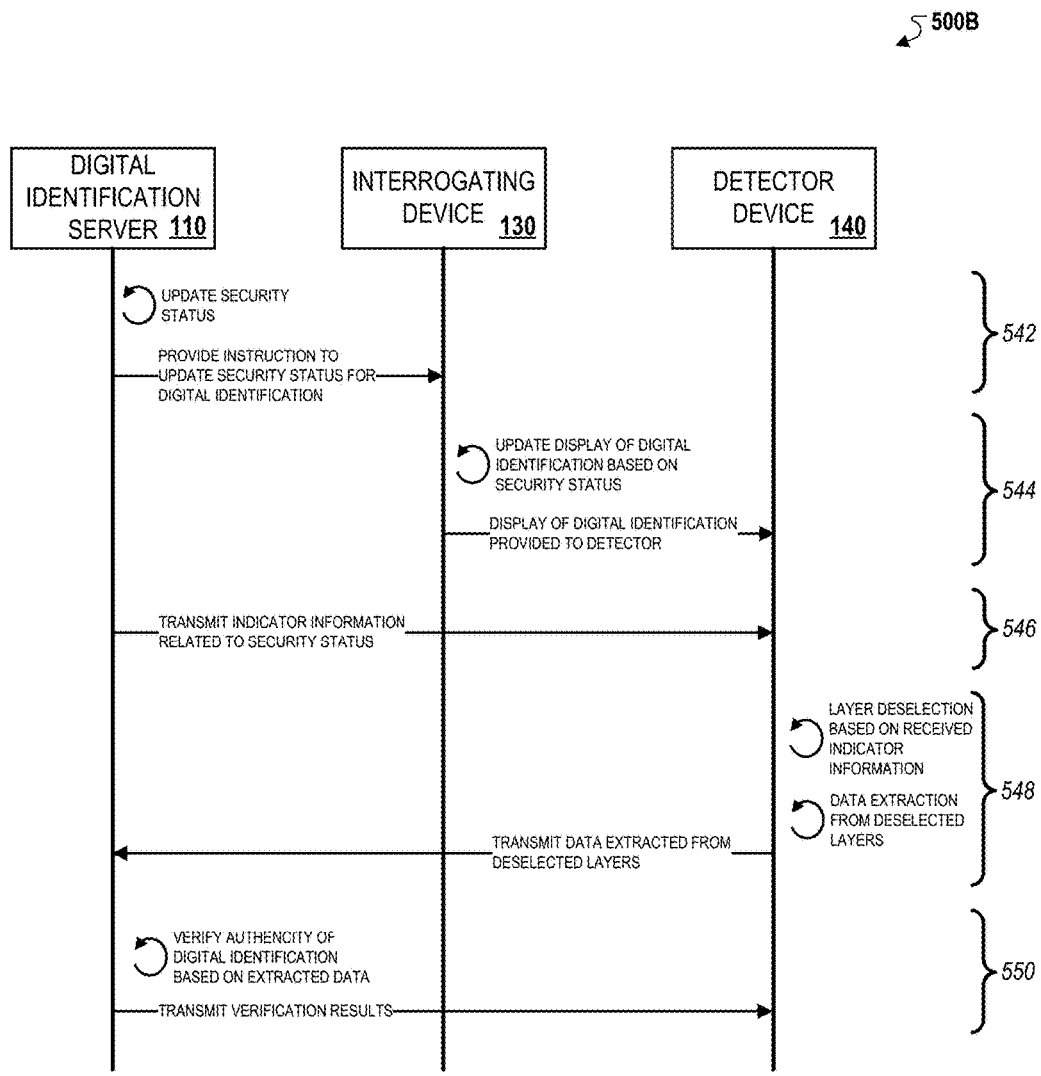
FIG. 5B illustrates an interaction diagram between a digital identification server, a user device, and a detector device during an example process for verifying an enhanced physical identification document using visual indicators with embedded user credential data.

Although FIG. 5B depicts the digital identification server 110 performing the verification of the physical identification document 132 using the extracted user credential data 534, in some implementations, the verification operation may instead be performed on-device by the detector device 140, that is, the interrogating device 130, after extracting the user credential data 534 from the set of deselected layers 532 based on prior communications with the server. In such implementations, the assigned security status may include instructions to perform the verification operation locally on the detector device 140. The instructions may include computer-readable programs that enable the detector device 140 to compare the extracted user credential data 534 and the expected credential data designated by the assigned security status. In this regard, once the detector device 140 receives the information related to the security status of the physical identification document 132, the detector device 140 may perform the verification operation offline without connectivity to the digital identification server 110.

Figure 6A:
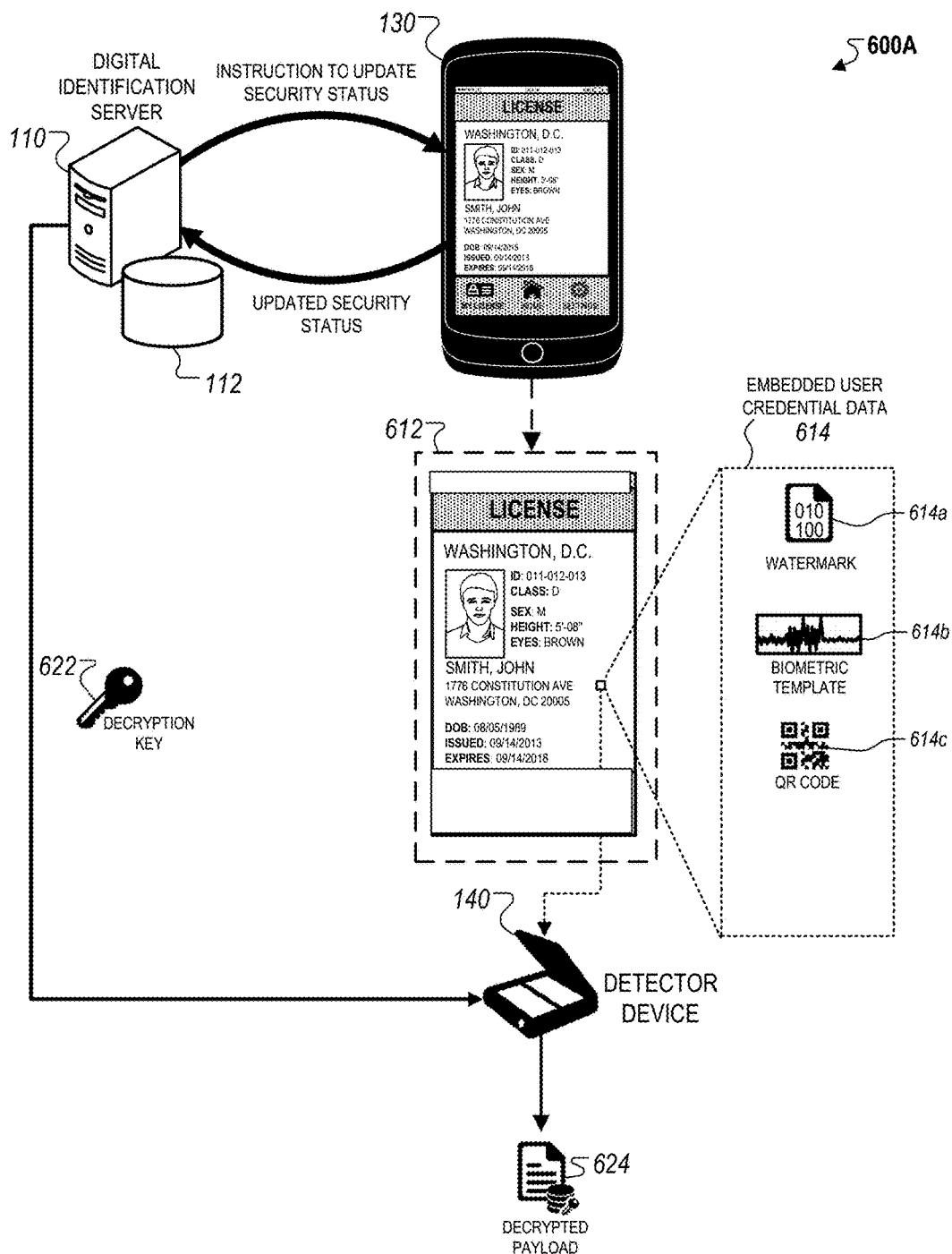
FIG. 6A illustrates a block diagram of a system using invisible user credential data that may be included in an enhanced physical identification document.

FIG. 6A illustrates a block diagram of an example system using embedded user credential data 614 that may be embedded in the physical identification document 132. Briefly, the interrogating device 130 may exchange communications with the digital identification server 110, and generate the physical identification document 132 including embedded user credential data 614. The detector device 140 may detect and extract the embedded user credential data 614 from the digital identification 132. The detector device 140 may then receive a decryption key 622 from the digital identification server 110, which is used to decrypt the embedded user credential data and extract a decrypted payload 634 that is used to verify the physical identification document 132.

The embedded user credential data 614 may represent user credential data that rendered on the physical identification document 132 but not visible to humans. For instance, the embedded user credential data 614 may include printed (or rendered) physical instantiations of digital data packets that are embedded within the physical identification document 132 such that extraction of the embedded user credential data 614 generates user information that may be used to verify the physical identification document 132 and protect against fraudulent use. For instance, as depicted in FIG. 6A, the embedded credential data 614 may include various types of encrypted data such as a watermark 614a, a biometric template 614b, and/or a QR code 814c.

The watermark 614a may include one or more graphical patterns that include encrypted payloads of user information. In one example, the watermark 614a may be static representation of graphical pattern (e.g., a picture or a combination of symbols). The encrypted payloads of user information may include secure user information such as personally identifiable information of the user as described previously.

In some implementations, the watermark 614a may additionally include checksum information that is a small-size datum from an arbitrary digital data block within the embedded user credential data 614 that is used for error checks during data transmission and/or storage. The checksum information may also be used to verify data integrity of the encrypted payloads of user information.

The detector device 140 may detect the watermark 614a using visual light detection of optical signals transmitted by the graphical patterns of the watermark 614a. In some implementations, the detector device 140 may include software that is configured to detect watermark signals that are read from the physical identification document 132. For example, the physical identification document 132 may be presented under a scanner of the detector device 140, which may optically scan the surface of the physical identification document 132 to determine if the watermark 614a may be detected within the physical identification document 132.

The biometric template 614b may be include a biometric label for one or more of a user's characteristics embedded within the physical identification document 132 that is used to verify the actual presence of a user compared to biometric information that was previously presented. For example, in some instances, the biometric template may be automatically read by the detector device 140 upon scanning the interrogating device 130. In other instances, the biometric template may be read after receiving using server input that decrypts an encrypted instantiation of the biometric template 614b.

The QR code 614c may be a matrix barcode or a two dimensional barcode that is a machine-readable optical label included within the physical identification document 132. The QR code 614c may be placed on any region of the physical identification document 132 and used to represent secure and insecure user information. For instance, the QR code 614c may use standard encoding techniques (e.g., numeric, alphanumeric, byte/binary, kanji, etc.) to represent data associated with user information.

As described above, the embedded user credential data 614 may include user information in the form of encrypted payloads. For instance, the encrypted payloads may be data packets of user information that is restricted for access by the digital identification server 110. For example, the digital identification server 110 may generate the key distribution messages using encryption techniques such as, for example, creating a unique, fixed-length hash signature for the encrypted payload, using private key cryptographic techniques, or using a public-key cryptographic techniques that includes the use of an encryption key to encrypt all user payloads, and the use of a specific decryption key that is provided to authorized devices.

After the detector device 140 extracts the encrypted payloads from the embedded user credential data 614, the detector device 140 may be provided with the decryption key 622 to decrypt the encrypted payloads and generate the decrypted payload 624. For instance, as described above, the decryption key 622 may vary based on the particular encryption technique utilized by the digital identification server 110 used to generate the encrypted payloads that are encoded in the embedded user credential data 614. For example, where the encrypted payloads are generated using hashing, the decryption key 622 may be the unique hash that is used to encrypt the encrypted payloads. In another example where the encrypted payloads are generated using a private-key, the decryption key 622 may be the private-key used to encrypt the encrypted payloads. In yet another example where the encrypted payloads are generated using a public-key, the decryption key 622 may be a decryption key that is associated with the public-key and maintained by the digital identification server 110.

The decrypted payload 624 may include user information, which is used by the detector device 140 to verify the user information included in the digital identification. For example, in some instances, the detector device 140 may transmit the user information included in the decrypted payload 624 to the digital identification server 110, which may compare the received user information to the user entry for the digital identification on the digital identification server 110. In this example, if the received user information matches the user information included in the user entry within the digital identification database 112, then the digital identification server 110 may transmit an instruction to the detector device to display a notification that the physical identification document 132 is valid.

In some implementations, the verification of the user information included in the decrypted payload 624 may be performed on-device on the detector device 140, that is, on the interrogating device 130. In such implementations, in addition to transmitting the decryption key 622, the digital identification server 110 may additionally transmit user information designated by the assigned security status of the physical identification document 132, and instructions to perform a comparison between the user information designated by the assigned security status of the physical identification document 132 and the user information included in the decrypted payload 624. In this regard, after receiving an initial transmission from the digital identification server 110, the detector device 140 may be used to perform the verification of the physical identification document 132 offline without network connectivity to the digital identification server 110, which may enable the verification of the physical identification document 132 without access to the user entry on the digital identification database 112.

As described throughout, computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method of inspecting an identification document using information from a server, the method comprising:

reading, via machine readable information and using an interrogation device, reference information from an identification document, wherein the machine readable information represents encoded data embedded at the identification document that is processed using an imaging sensor on the interrogation device;

configuring, based on the machine readable information and using the interrogation device, a request to a host configured to support a second stage of processing of the identification document;

transmitting the request to the host;

receiving, from the host, a watermark decode instruction for the second stage of processing on the identification document, wherein the watermark decode instruction is configured to obtain additional information that differs from the encoded data embedded at the identification document;

using, in the second stage of processing on the identification document, the watermark decode instruction to read a second portion of information from the identification document, which comprises using the watermark decode instruction to process the additional information that differs from the encoded data embedded at the identification document, wherein the additional information represents the second portion of information;

using the interrogation device to capture a biometric signal from a user presenting the identification document, wherein the biometric signal is digital data that corresponds to a physical biometric feature of the user presenting the identification document;

relating the biometric signal to the second portion of information; and providing, based on relating the biometric signal to the second portion of information, an indication of whether the user presenting the identification document has biometric characteristics related to biometric data in the second portion of information associated with the identification document.

2. The method of claim 1 wherein:

reading reference information from the identification document includes reading a quick response (QR) code from a driver's license using an imaging sensor on a wireless device;

configuring the request to the host includes deriving an address information of a record associated with the driver's license on the host based on the QR code;

transmitting the request to the host includes requesting information using the address information of the record associated with the driver's license on the host;

using the interrogation device to capture the biometric signal from the user presenting the identification document includes capturing an image of the user presenting the identification document; and relating the biometric signal to the second portion of information includes relating the image of the user presenting the identification document to a facial recognition template of the user stored on the identification document.

3. The method of claim 1 wherein reading the reference information from the identification document includes reading obfuscated information appearing within a first image region within the identification document, the obfuscated information configured to be illegible to visual inspection by a human.

4. The method of claim 1 wherein configuring the request includes translating information received into an instruction for processing, wherein the reference information requires the interrogating device to provide supplemental information in order for the interrogating device to generate the request.

5. The method of claim 1 wherein receiving, from the host, the watermark decode instruction includes receiving an decryption key used to decode the second portion of information.

6. The method of claim 5 wherein the decryption key is used to decode biometric information stored within second portion of information.

7. The method of claim 1 wherein receiving, from the host, the watermark decode instruction includes receiving mapping information configured to instruct the imaging device where the second portion of information is located within identification document.

8. The method of claim 1 further comprising performing a liveness check before (i) relating the biometric signal to the second portion of information, or (ii) transmitting the request to the host.

9. The method of claim 1 further comprising, enabling an operator of the interrogation device to access enhanced information from the host in response to relating the biometric signal to the second portion of information.

10. The method of claim 1 wherein:

reading reference information from the identification document includes reading a line code from a driver's license using an imaging sensor on a wireless device;

configuring the request to the host includes deriving an address information of a record associated with the driver's license on the host based on the line code;

transmitting the request to the host includes requesting information using the address information of the record associated with the driver's license on the host;

receiving, from the host, a watermark decode instruction for the second stage of processing on the driver's license includes receiving the watermark decode instruction configured to read additional information that differs from the line code;

using the watermark decode instruction to read the second portion of information from the identification document includes using the watermark decode instruction to read the additional information that differs from the line code, the additional information that differs from the line code representing the second portion of information;

using the interrogation device to capture the biometric signal from the user presenting the identification document includes capturing an image of the user presenting the identification document; and relating the biometric signal to the second portion of information includes relating the image of the user presenting the identification document with a facial recognition of the user stored on the identification document.

11. The system of claim 1 wherein:

reading reference information from the identification document includes reading a quick response (QR) code from a driver's license using an imaging sensor on a wireless device;

configuring the request to the host includes deriving an address information of a record associated with the driver's license on the host based on the QR code;

transmitting the request to the host includes requesting information using the address information of the record associated with the driver's license on the host;

using the interrogation device to capture the biometric signal from the user presenting the identification document includes capturing an image of the user presenting the identification document; and relating the biometric signal to the second portion of information includes relating the image of the user presenting the identification document to a facial recognition template of the user stored on the identification document.

12. A system configured to inspect an identification document using information from a server, the system comprising a processor configured to perform steps that include:

reading, via machine readable information and using an interrogation device, reference information from an identification document, wherein the machine readable information represents encoded data embedded at the identification document that is processed using an imaging sensor on the interrogation device;

configuring, based on the machine readable information and using the interrogation device, a request to a host configured to support a second stage of processing of the identification document;

transmitting the request to the host;

receiving, from the host, a watermark decode instruction for the second stage of processing on the identification document, wherein the watermark decode instruction is configured to obtain additional information that differs from the encoded data embedded at the identification document;

using, in the second stage of processing on the identification document, the watermark decode instruction to read a second portion of information from the identification document which comprises using the watermark decode instruction to process the additional information that differs from the encoded data embedded at the identification document, wherein the additional information represents the second portion of information;

using the interrogation device to capture a biometric signal from a user presenting the identification document, wherein the biometric signal is digital data that corresponds to a physical biometric feature of the user presenting the identification document;

relating the biometric signal to the second portion of information; and providing, based on relating the biometric signal to the second portion of information, an indication of whether the user presenting the identification document has biometric characteristics related to biometric data in the second portion of information associated with the identification document.

13. The system of claim 12 wherein reading the reference information from the identification document includes reading obfuscated information appearing within a first image region within the identification document, the obfuscated information configured to be illegible to visual inspection by a human.

14. The system of claim 12 wherein configuring the request includes translating information received into an instruction for processing, wherein the reference information requires the interrogating device to provide supplemental information in order for the interrogating device to generate the request.

15. The system of claim 12 wherein receiving, from the host, the watermark decode instruction includes receiving an decryption key used to decode second portion of information.

16. The system of claim 15 wherein the decryption key is used to decode biometric information stored within second portion of information.

17. The system of claim 12 wherein receiving, from the host, the watermark decode instruction includes receiving mapping information configured to instruct the imaging device where the second portion of information is located within identification document.

18. The system of claim 12 further comprising performing a liveness check before (i) relating the biometric signal to the second portion of information, or (ii) transmitting the request to the host.

19. The system of claim 12 further comprising, enabling an operator of the interrogation device to access enhanced information from the host in response to relating the biometric signal to the second portion of information.

20. The system of claim 12 wherein:

reading reference information from the identification document includes reading a line code from a driver's license using an imaging sensor on a wireless device;

configuring the request to the host includes deriving an address information of a record associated with the driver's license on the host based on the line code;

transmitting the request to the host includes requesting information using the address information of the record associated with the driver's license on the host;

receiving, from the host, a watermark decode instruction for the second stage of processing on the driver's license includes receiving the watermark decode instruction configured to read additional information that differs from the line code;

using the watermark decode instruction to read the second portion of information from the identification document includes using the watermark decode instruction to read the additional information that differs from the line code, the additional information that differs from the line code representing the second portion of information;

using the interrogation device to capture the biometric signal from the user presenting the identification document includes capturing an image of the user presenting the identification document; and relating the biometric signal to the second portion of information includes relating the image of the user presenting the identification document with a facial recognition of the user stored on the identification document.

* * * * *